United States Patent [19]

Fujisawa et al.

[11] Patent Number: 4,637,711
[45] Date of Patent: Jan. 20, 1987

[54] PROCESS FOR ROLLING A DRUM WITH A PHOTOSENSITIVE FILM

[75] Inventors: Kunio Fujisawa, Saitama; Toyoji Tanaka, Tokyo; Toshio Mochizuki, Saitama; Norio Nakamura, Saitama; Seiji Kaya, Saitama, all of Japan

[73] Assignee: Fujirex Company, Ltd., Japan

[21] Appl. No.: 798,175

[22] Filed: Nov. 14, 1985

[30] Foreign Application Priority Data

Nov. 14, 1984 [JP]   Japan .................................. 59-240189

[51] Int. Cl.⁴ ......................... G03B 27/58; H04N 1/08
[52] U.S. Cl. ...................................... 355/72; 346/138; 355/110; 358/291

[58] Field of Search ................ 358/291, 302; 346/138; 354/15, 18, 19; 355/72, 75, 48, 110

[56] References Cited

U.S. PATENT DOCUMENTS

| | | | |
|---|---|---|---|
| 4,054,884 | 10/1977 | Nelson | 358/291 X |
| 4,330,798 | 5/1982 | Heyer et al. | 358/291 |
| 4,440,491 | 4/1984 | Takahama | 355/75 |

Primary Examiner—Richard A. Wintercorn
Attorney, Agent, or Firm—Ostrolenk, Faber, Gerb & Soffen

[57] ABSTRACT

A method of rolling a photosensitive film on a drum wherein the film is wound on the drum being held at the seam by a double-sided adhesive band and then heat shrunk into a smooth surface on the drum.

2 Claims, 2 Drawing Figures

PROCESS FOR ROLLING A DRUM WITH A PHOTOSENSITIVE FILM

BACKGROUND OF THE INVENTION

The present invention relates to a process for rolling a drum with a photosensitive film in a duplicating machine or similar device.

According to the present invention, it becomes possible to easily roll a photosensitive film around a drum with a suitable tension and it becomes possible to easily maintain the weight balance of the drum.

This invention achieves this objective. By making the photosensitive film tubular by uniting the seam-edge parts on both sides of the photosensitive film through a thermally contractible film. The drum is there rolled without any slippage of the photosensitive film by causing the thermally contractible film to contract by heating same.

In prior photosensitive drums used in duplicating machines, the surface of the drum has been directly given an OPC coating in the past. Since the drum having such coating is heavy and difficult to handle, this method was suitable for small-sized drums.

This problem has been met initially by various methods for rolling the drum with a photosensitive film. Prior methods for rolling the drum with the photosensitive film not only elevates the cost by making the structure of the drum more complicated but it becomes difficult to roll the drum with the photosensitive film at a predetermined tensile force. In some cases, there develops a problem of creating wrinkles in the photosensitive film. This problem becomes all the more conspicuous at the time when a large-sized photosensitive drum is to be formed.

In the aforementioned process, further, the weight balance of the drum is destroyed by the groove which is used to attach the film with the result that it is necessary to install a balancer or create a special shape in order to achieve balancing.

The present invention was made in the light of the aforementioned problems.

BRIEF DESCRIPTION OF THE DRAWINGS

The objects and purpose of this invention will be further set forth in the following description and drawings in which.

Figure 1:
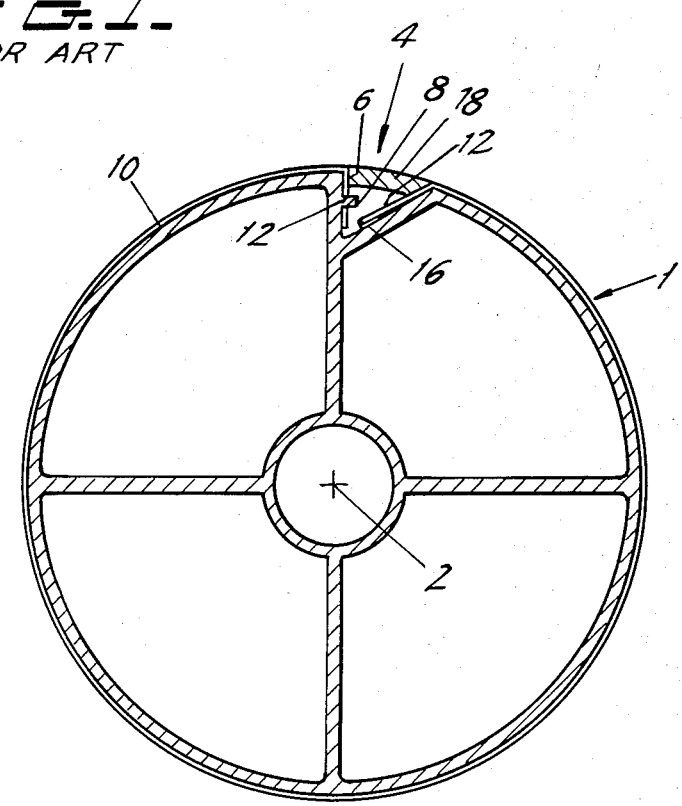
FIG. 1 is a cross-sectional view showing the construction of the conventional prior photosensitive drum.

Referring to the drawings, the salient elements include:
30: drum;
36: photosensitive film;
38: thermally contractible film; and
40: adhesive tape with both sides being adhesive The invention may best be understood by comparison with the prior art as shown in connection with FIG. 1. In a first conventional example of such methods, a V-shaped groove 4 is provided in parallel with the axial line 2 of the drum 1 on the surface of the drum 1. A plurality of pins are located on the surface 6 of one of the walls of the V-shaped groove 4 and a hole 12 which is suitable for one end of the photosensitive film 10 is engaged with the pin 8. Next, the drum 1 is rolled with the film 10. The other end of the film is adhesively secured to the other wall surface 12 of the V-shaped groove 4 by using the dual-side adhesive tape 16. Afterward, the V-shaped groove 4 is blocked with a cover member 18, thereby completing the construction.

According to a second conventional example of the method for rolling a drum with a photosensitive film, a somewhat shallow V-shaped groove is provided in parallel with the axial line of the drum on the surface of the drum in the same manner as in the first example, a plurality of pins and a plurality of hook members are provided on the surface of one of the surfaces of the V-shaped groove and a plurality of engaging holes are provided at the end part opposite to the photosensitive film and the aforementioned engagement holes of the photosensitive film which has been rolled to the drum are engaged with the aforementioned pins and hooks.

DETAILED DESCRIPTION OF THE INVENTION

Figure 2:
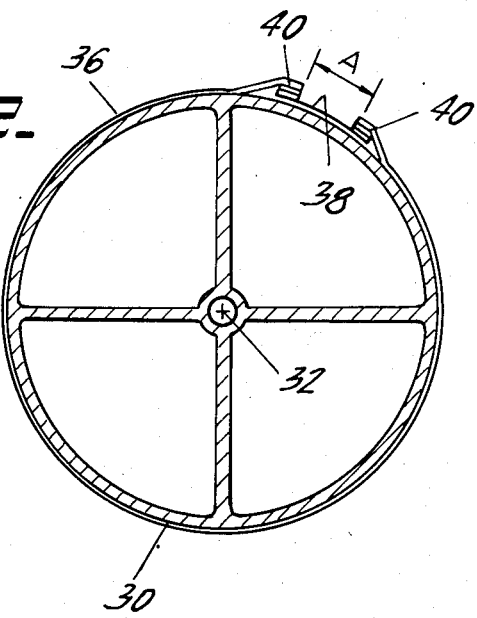
FIG. 2 is a cross-sectional view showing an example of this invention.

According to one example of the application of this invention as seen in FIG. 2, the aforementioned photosensitive film and thermally contractible film are united with an adhesive tape whose both sides are made adhesive.

The example of this invention is constructed in lineal symmetry with the axial line 32 of the drum 30 as the center. Next, the adhesive tape 40 with both sides being made adhesive is secured on the opposing edges of the thermally contractible film 38 which has been cut in such a manner as to have a width which is greater than the distance A between the edges which are produced at the time when the drum is rolled with the photosensitive film 36, as is shown in FIG. 2.

Next, one edge portion of the photosensitive film 36 is placed together with the adhesive tape 40 whose both sides are made adhesive and which has been secured to one edge of the thermally contractible film 38. After thermally contractible film 38 and photosensitive film 36 have been made integral with each other, the film is rolled at the prescribed location of the drum 30. The other edge of the photosensitive film 36 is placed and pasted together with the adhesive tape 40 whose both sides have been made adhesive at the other edge part of the thermally contractible film 38. This pasting operation can be carried out with such care that the photosensitive film 36 may be lightly rolled around the drum 30.

Next, the thermally contractible film 38 is contracted by blowing hot air to the thermally contractible film 38 by using a hair dryer, for instance, with a result that the drum 30 is rolled with the photosensitive film 36 with a certain suitable tensile force.

As another embodiment, the adhesive tape whose both sides have been made adhesive 40 may be pasted to both ends of the photosensitive film at first. Otherwise, the outside of the photosensitive film may be pasted with the thermally contractible film 38.

Since this invention is constructed in the manner described above, it becomes possible for the drum to be rolled with the photosensitive film with a desired tensile force. In addition, since the drum can be cylindrical in shape, it has the effect of maintaining the important balance by making it a simple shape which is easy for processing.

In the foregoing the present invention has been described in connection with illustrative embodiments thereof Since variations will now be obvious to those skilled in the art, it is preferred that the scope of this invention be determined by the appended claims.

What is claimed is:

1. A process for rolling a drum with a photosensitizer film, characterized in that the drum is rolled with a photosensitizer film by making the photosensitizer film tubular by uniting the seam-edge parts on both sides of the photosensitive film through a thermally contractible film and that the drum is rolled without any clearance with the photosensitive film by causing the thermally contractible film to contract by heating same.

2. A process for rolling a drum with a photosensitive film as in claim 1, in which said photosensitive film and said thermally contractible film are united by means of an adhesive tape whose both sides are made adhesive.

* * * * *